(12) United States Patent
Krug et al.

(10) Patent No.: US 12,524,227 B2
(45) Date of Patent: Jan. 13, 2026

(54) AUTOMATED GENERATION OF SEMANTIC SOFTWARE VERSIONS FOR APPLICATION PROGRAMMING INTERFACES

(71) Applicant: Boomi, LP, Conshohocken, PA (US)

(72) Inventors: Brian S. Krug, West Chester, PA (US); Beata Chrulkiewicz, Malvern, PA (US); Sigi Kattumangattu John, West Chester, PA (US); Peng Yan, Berwyn, PA (US); Rahul Agarwal, San Francisco, CA (US)

(73) Assignee: Boomi, LP, Conshohocken, PA (US)

( * ) Notice: Subject to any disclaimer, the term of this patent is extended or adjusted under 35 U.S.C. 154(b) by 189 days.

(21) Appl. No.: 18/377,736

(22) Filed: Oct. 6, 2023

(65) Prior Publication Data

US 2025/0117214 A1   Apr. 10, 2025

(51) Int. Cl.
  *G06F 8/71*   (2018.01)
(52) U.S. Cl.
  CPC ..................... *G06F 8/71* (2013.01)
(58) Field of Classification Search
  CPC .......................................................... G06F 8/71
  See application file for complete search history.

(56) References Cited

U.S. PATENT DOCUMENTS

| | | | |
|---|---|---|---|
| 9,176,730 B2* | 11/2015 | Weissman | G06F 8/71 |
| 9,400,645 B2* | 7/2016 | Mahajan | G06F 8/43 |
| 11,733,999 B2* | 8/2023 | Battaglia | G06F 8/71 |
| | | | 717/170 |
| 2002/0073110 A1* | 6/2002 | Duvillier | G06F 8/71 |
| 2005/0177826 A1* | 8/2005 | Miller | G06F 9/44536 |
| | | | 717/170 |
| 2012/0110564 A1* | 5/2012 | Ran | G06F 8/65 |
| | | | 717/173 |
| 2015/0254073 A1* | 9/2015 | Menard | G06F 8/71 |
| | | | 717/122 |
| 2015/0370827 A1* | 12/2015 | Parkison | G06F 16/178 |
| | | | 707/610 |
| 2019/0196805 A1* | 6/2019 | Lee | G06F 21/6209 |
| 2019/0384650 A1* | 12/2019 | Danielsson | G06F 8/65 |
| 2023/0086753 A1* | 3/2023 | Frank | G06F 16/219 |
| 2023/0093370 A1* | 3/2023 | Battaglia | G06F 8/65 |
| | | | 717/170 |

* cited by examiner

*Primary Examiner* — Douglas M Slachta
(74) *Attorney, Agent, or Firm* — Procopio, Cory, Hargreaves & Savitch LLP (57) ABSTRACT

Traditionally, version numbers for application programming interfaces are determined manually and do not convey semantic meaning. Accordingly, disclosed embodiments automatically generate a version number for an application programming interface based on the changes, if any, from a past deployment to a current deployment of the application programming interface. The version number may comprise a major version number that is incremented when a change is to the interface and affects the operation of clients that utilize the application programming interface. The version number may also comprise a minor version number that is incremented when a change is to the interface, but does not affect the operation of clients. The version number may also comprise a patch version number that is incremented when a change is only to the implementation of the application programming interface.

18 Claims, 4 Drawing Sheets

AUTOMATED GENERATION OF SEMANTIC SOFTWARE VERSIONS FOR APPLICATION PROGRAMMING INTERFACES

BACKGROUND

Field of the Invention

The embodiments described herein are generally directed to version control, and, more particularly, to the automated generation of semantic software versions for application programming interfaces.

DESCRIPTION OF THE RELATED ART

An application programming interface (API) comprises two parts. The first part is the public interface, which defines one or more operations that can be performed via the application programming interface, and which can be described using the OpenAPI™ specification format or another format. The second part is the implementation of an operation, which is executed when the operation is called via the interface.

One potential use of an application programming interface is as an interface to an integration process. For example, integration platform as a service (iPaaS) enables the integration of applications and data. The iPaaS platform provided by Boomi® of Chesterbrook, Pennsylvania, enables developers to construct and deploy integration processes. Each of these integration processes may comprise an application programming interface that enables access to the integration process by a software application, another integration process, an external system, and/or other client. In other words, a client may make a request to the integration process (e.g., to trigger the integration process) via the application programming interface.

The iPaaS platform, provided by Boomi®, enables developers to change the interface, as well as the implementation, of each application programming interface. Each application programming interface has an official version that is communicated to the consumers of the application programming interface. Any change to the interface that may require a change to a client should result in a new version of the application programming interface. On the other hand, a change to the implementation generally does not require a new version of the application programming interface, since such a change will not affect how the application programming interface is called. As a result, two deployments of an application programming interface that have the same interface, but different implementations, will have the same version number.

Thus, the developer of the application programming interface (e.g., the developer of the integration process that provides the application programming interface) cannot rely on the application programming interface version number to distinguish between two deployments of the application programming interface, such as a test deployment and a production deployment. In addition, the API version number cannot be used during testing to link test results to specific combinations of an interface and implementation.

Another problem facing the API developer is the ability to replicate an API deployment. An application programming interface may have several endpoints, with each endpoint backed by a different implementation. To replicate a deployment of the application programming interface from a test environment to a production environment, the developer would need to use the same interface, as well as the same implementation. Traditionally, the developer must manually record the version numbers of all implementations needed in order to replicate deployments.

For proper API versioning, the changes to the application programming interface should be analyzed, and a decision must be made as to whether or not the version number needs to be incremented and, if so, how the version number is to be incremented. However, the interface and implementation are often the responsibilities of different people. Thus, the changes must be communicated between various entities (e.g., developers and managers), so that a decision about the version number can be made manually. This is time-consuming and prone to human error. In addition, traditional version numbers do not convey semantic meaning, such as whether or not a new version of an application programming interface may "break" the clients that utilize the application programming interface.

SUMMARY

Accordingly, systems, methods, and non-transitory computer-readable media are disclosed for automated generation of semantic software versions for application programming interfaces, such as those for integration processes (e.g., on an iPaaS platform).

In an embodiment, a method comprises using at least one hardware processor to, in response to a new deployment of an application programming interface: determine whether or not a prior deployment of the application programming interface exists; when a prior deployment exists, calculate a version number based on at least one change to the application programming interface between the prior deployment and the new deployment; when no prior deployment exists, determine the version number based on an initial version number; and add the version number to metadata associated with the new deployment. The application programming interface may comprise an interface and an implementation. The version number may comprise a major version number and a minor version number. The version number may comprise a major version number, followed by a minor version number, followed by a patch version number.

Calculating the version number may comprise: determining whether or not the at least one change affects operation of clients that utilize the application programming interface; when determining that the at least one change affects operation of the clients, incrementing the major version number; and when determining that the at least one change does not affect operation of the clients, not incrementing the major version number. Determining whether or not the at least one change affects operation of the clients may comprise determining that the at least one change affects operation of the clients when the at least one change comprises one or more of: changing a path within the interface; removing a route through the interface; changing an input schema of an operation in the interface; or changing an output schema of an operation in the interface.

Calculating the version number may further comprise, when determining that the at least one change does not affect operation of the clients: determining whether or not the at least one change adds a route through the interface; when determining that the at least one change adds a route through the interface, incrementing the minor version number; and when determining that the at least one change does not add a route through the interface, not incrementing the minor version number. The version number may further comprise a patch version number.

Calculating the version number may further comprise, when determining that the at least one change does not add a route through the interface: determining whether or not the at least one change is to the implementation; when determining that the at least one change is to the implementation, incrementing the patch version number; and when determining that the at least one change is not to the implementation, using a version number of the prior deployment as the version number. Determining whether or not the at least one change is to the implementation may comprise comparing one or more internal version numbers in the implementation of the new deployment to one or more internal version numbers in the implementation of the prior deployment.

The method may further comprise using the at least one hardware processor to, when no prior deployment exists, create metadata for the new deployment. The method may further comprise using the at least one hardware processor to create a snapshot of the new deployment with the version number. The snapshot may comprise an identifier and version of each artifact of the application programming interface, including each operation in the application programming interface. The snapshot may further comprise an identifier and version of each dependency of each artifact of the application programming interface. The snapshot may further comprise an identifier and version of an implementation of each operation in the application programming interface. The snapshot may further comprise an identifier and version of each of an input schema and an output schema of each operation in the application programming interface.

The version number may be automatically added to the metadata. Alternatively, the version number may be added to the metadata in response to a user operation.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for automated generation of semantic software versions for application programming interfaces. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
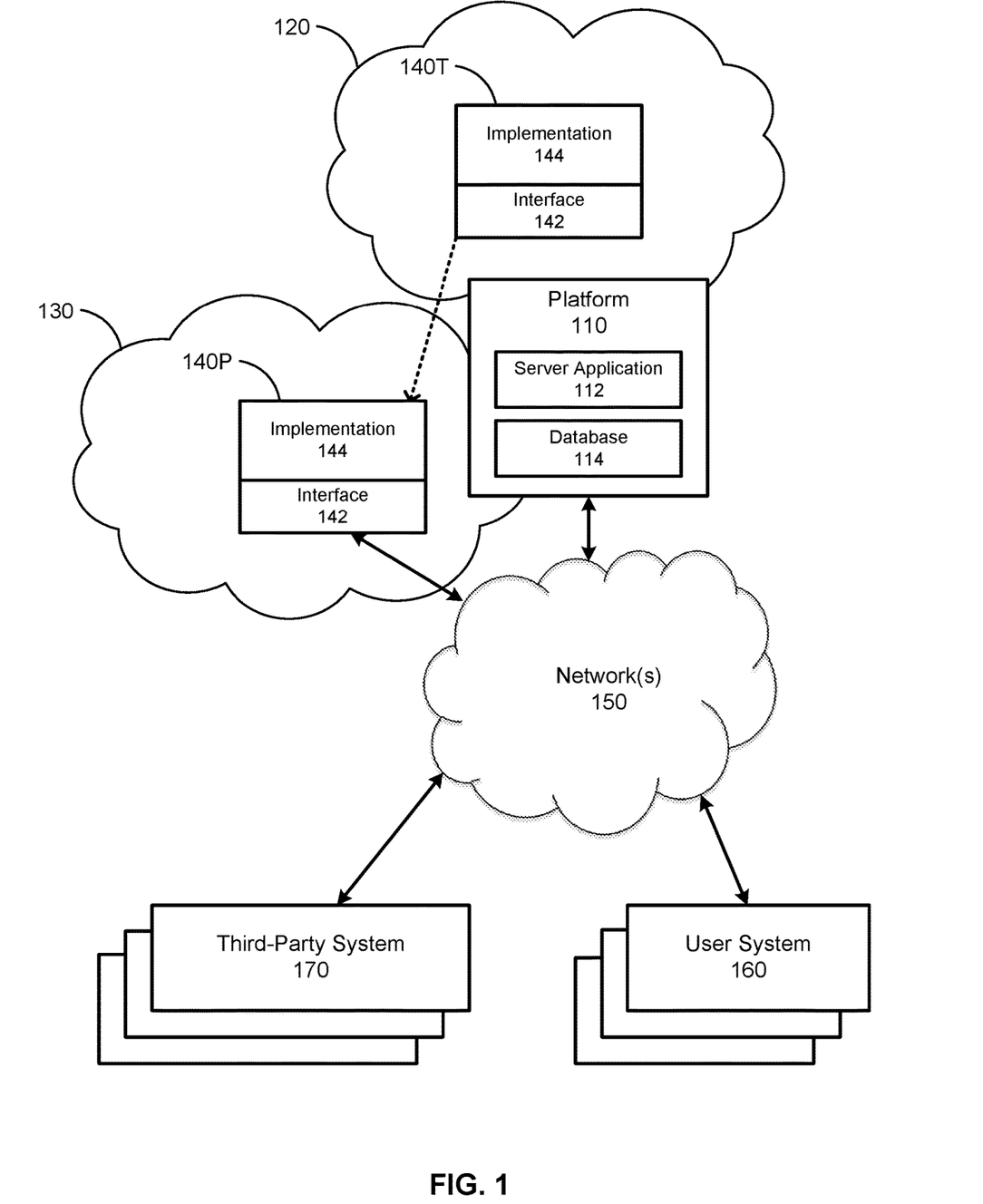
FIG. 1 illustrates an example infrastructure, in which one or more of the processes described herein may be implemented, according to an embodiment.

FIG. 1 illustrates an example infrastructure, in which one or more of the processes described herein may be implemented, according to an embodiment. The infrastructure may comprise a platform 110 (e.g., one or more servers) which hosts and/or executes one or more of the processes described herein, which may be implemented in software and/or hardware. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may execute a server application 112, which may comprise one or more software modules implementing one or more of the disclosed processes. Platform 110 may also manage one or more databases 114, which may store data used by server application 112. Platform 110 may be communicatively connected to one or more networks 150.

Server application 112 may manage a test environment 120 and/or production environment 130 for one or more software processes that utilize an application programming interface 140, via which clients can access the software process(es). As discussed above, each application programming interface may comprise an interface 142 and an implementation 144. Interface 142 defines access to the operation(s) in application programming interface 140 (e.g., routes, paths, input and output schemas, etc.) and implementation 144 is the code that is executed to perform the operation(s). An application programming interface 140T in test environment 120 may be deployed from test environment 120 to production environment 130 (e.g., based on a user operation). The resulting application programming interface 140P in production environment 130 may be communicatively connected to network(s) 150.

One example of a software process that may utilize an application programming interface 140 is an integration process. An integration process may represent a transaction involving the integration of data between two or more systems, and may comprise a series of steps that specify logic and transformation requirements for the data to be integrated. Each step may transform, route, and/or otherwise manipulate data to attain an end result from input data. For example, an initial step in an integration process may receive data from one or more data sources (e.g., via an application programming interface 140 of the integration process), may manipulate the retrieved data in a specified manner (e.g., including analyzing, normalizing, altering, updated, enhancing, augmenting, etc.), and in a final step, send the manipulated data to one or more specified destinations. An integration process may represent a business workflow or a portion of a business workflow or a transaction-level interface between two systems, and comprise, as one or more steps, software modules that process data to implement the business workflow or interface. A business workflow may comprise any myriad of workflows of which an organization may repetitively have need. For example, a business workflow may comprise, without limitation, procurement of parts or materials, manufacturing a product, selling a product, shipping a product, ordering a product, billing, managing inventory or assets, providing customer service, ensuring information security, marketing, onboarding or offboarding an employee, assessing risk, obtaining regulatory approval, reconciling data, auditing data, providing information technology services, and/or any other workflow that an organization may implement in software.

Network(s) 150 may comprise the Internet, and communication through network(s) 150 may utilize standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 150, it should be understood that platform 110 may be connected to the various systems via different sets of one or more networks. For example, platform 110 may be connected to a subset of systems via the Internet, but may be connected to another subset of systems via an intranet.

Platform 110 may be communicatively connected to one or more user systems 160 via network(s) 150. While only a few user systems 160 are illustrated, it should be understood that platform 110 may be communicatively connected to any number of user systems 160 via network(s) 150. User system(s) 160 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 160 would be the personal or professional workstation of a developer of an application programming interface 140. In particular, the developer may interact with server application 112, via a graphical user interface, to construct, develop, edit, delete, deploy, and/or otherwise manage application programming interfaces 140, including their constituent interfaces 142 and implementations 144. It should be understood that multiple developers, on multiple user systems 160, may manage the same application programming interface 140 and/or different application programming interfaces 140 in this manner.

One or more third-party systems 170 may also be communicatively connected to network(s) 150, such that each third-party system 170 may communicate with a software process in production environment 130 via an application programming interface 140P. For example, third-party system 170 may host and/or execute a software application that pushes data to a software process via application programming interface 140P and/or pulls data from a software process via application programming interface 140P. For example, the software application on third-party system 170 may comprise enterprise resource planning (ERP) software, customer relationship management (CRM) software, accounting software, and/or the like. Third-party system 170 may be a client or consumer of application programming interfaces 140.

2. Example Versioning Process

Figure 2:
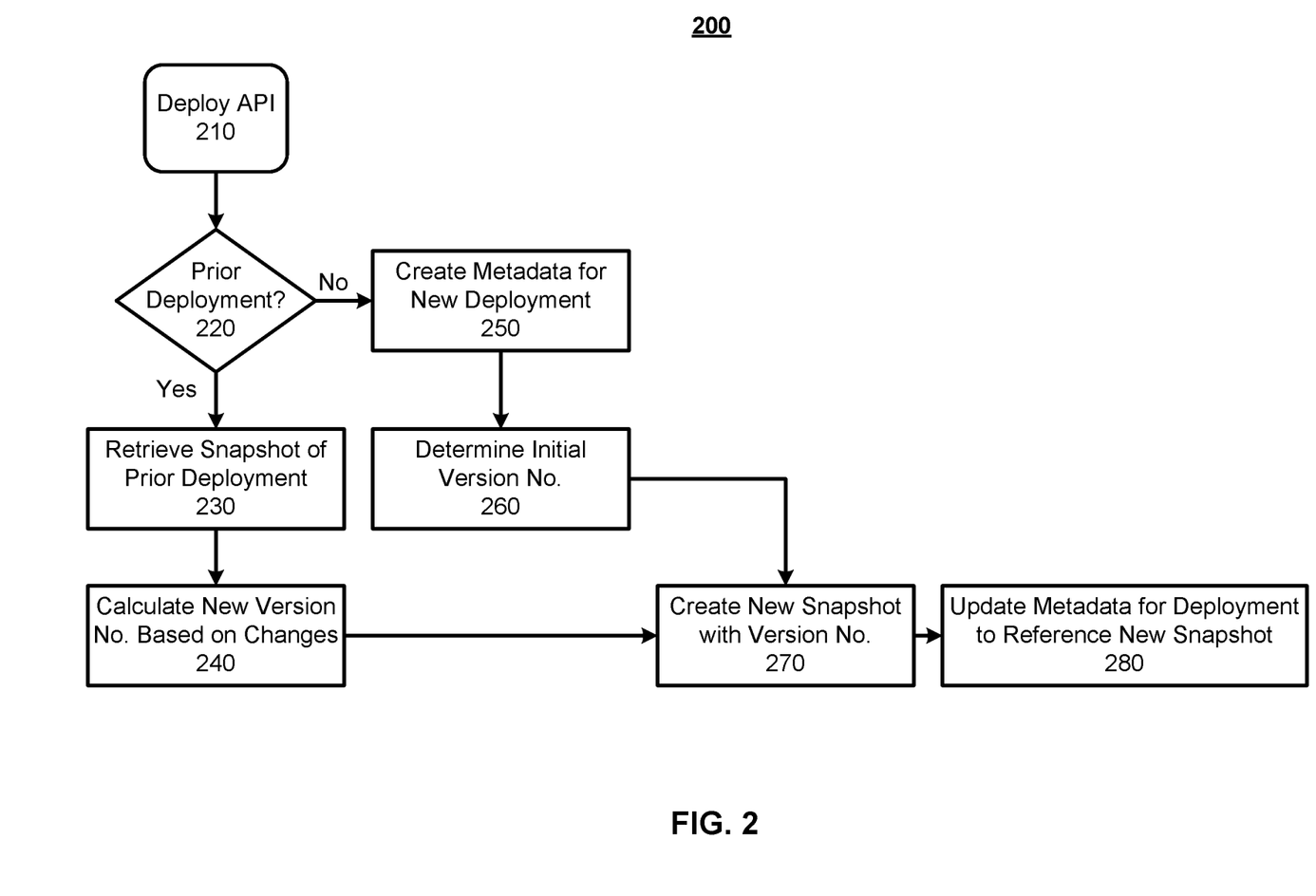
FIG. 2 illustrates a process for automated generation of semantic software versions for application programming interfaces, according to an embodiment.

FIG. 2 illustrates a process 200 for automated generation of semantic software versions for application programming interfaces 140, according to an embodiment. Process 200 may be implemented by server application 112 on platform 110. While process 200 is illustrated with a certain arrangement and ordering of subprocesses, process 200 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Process 200 may be automatically executed in response to the deployment or initiation of the deployment of an application programming interface 140 in subprocess 210. For example, application programming interface 140 may be deployed from a test environment 120 to a production environment 130. In an embodiment, a developer, on user system 160, may perform a user operation, in the graphical user interface of server application 112, to deploy an application programming interface 140 to production environment 130. This deployment may trigger process 200 in subprocess 210. It should be understood that a specific instance of an application programming interface 140 is deployed in subprocess 210.

In subprocess 220, it is determined whether or not the application programming interface 140, which is deployed in subprocess 210, has an existing deployment. In other words, it is determined whether or not the deployment in subprocess 210 represents a change to or redeployment of a prior application programming interface 140. Each application programming interface 140 may have a unique API identifier, such that two deployments of the same application programming interface 140 can be easily identified by their matching API identifiers. When determining that there is a prior deployment (i.e., "Yes" in subprocess 220), process 200 proceeds to subprocess 230. Otherwise, when determining that there is no prior deployment (i.e., "No" in subprocess 220), process 200 proceeds to subprocess 250.

In subprocess 230, the snapshot of the prior deployment is retrieved. For example, a snapshot of each deployment may be stored in database 114. Server application 112 may retrieve the snapshot of the most recent version of application programming interface 140. It should be understood that this most recent version is the prior deployment of application programming interface 140 that existed immediately before the current deployment of the application programming interface 140 in subprocess 210.

In subprocess 240, a new version number is calculated based on one or more changes, if any, between the prior deployment of application programming interface 140, for which a snapshot was retrieved in subprocess 230, and the current deployment of application programming interface 140 in subprocess 210. An embodiment of the calculation in subprocess 240 is described elsewhere herein. Regardless of how the new version number is calculated, the new version number, output by subprocess 240, is provided to subprocess 270.

A change between the prior and current deployments may be a change to interface 142 or a change to implementation 144. Changes in interface 142 between the prior and current deployments may be determined by comparing the interface 142 of the prior deployment to the interface 142 of the current deployment. This may include comparing the input schemas (e.g., defining the inputs) of the prior and current interfaces 142, the output schemas (e.g., defining the outputs) of the prior and current interfaces 142, the headers of the prior and current interfaces 142, and/or any other attribute(s) of the prior and current interfaces 142 that may affect utilization of interface 142 by a client. Differences in such attributes indicate a change in interface 142 between the prior and current deployments.

Changes in implementations 144 between the prior and current deployments may be determined by comparing the internal version numbers of the respective deployments. These internal version numbers may be produced by version control software that is used by the developer (e.g., within server application 112). A difference in the internal version number(s) in implementation 144 of the current deployment from the internal version number(s) in implementation 144 of the prior deployment indicates a change in implementation 144 between the prior and current deployments. In an embodiment, the degree of change in implementation 144 is not considered, except as may be reflected by the difference in the internal version numbers.

In subprocess 250, since there is no existing deployment of application programming interface 140, the deployment in subprocess 210 is the first deployment of application programming interface 140. Thus, metadata is created for the new deployment of application programming interface 140. The metadata may comprise one or more descriptors of the deployment.

In subprocess 260, an initial version number is determined for the new deployment of application programming interface 140. In an embodiment, version numbers utilize a format of [major]. [minor]. [patch], in which [major] is the major version number, [minor] is the minor version number, and [patch] is the patch version number. In other words, each version number comprises a major version number, followed by a minor version number, followed by a patch version number. Notably, as will be described in more detail elsewhere herein, such a version-number format conveys semantic meaning, which enables a consumer of application programming interface 140 to understand the type of changes that separate different versions of the application programming interface 140, which in turn enables the consumer to take appropriate action with respect to a new version of application programming interface 140. In particular, the version numbers may conform to Semantic Versioning 2.0.0, under the Creative Commons 3.0 license, or other semantic versioning specification. While this version-number format will be used throughout, it should be understood that other formats of the version number may be used instead.

The initial version number may be a fixed number that is always used for every new deployment. As an example using the above format, the initial version number may be 1.0.0, indicating a major version number of 1, a minor version number of 0, and a patch version number of 0. However, it should be understood that other initial version numbers are possible, such as 0.0.0, 1.1.1, 1.1.0, 1.0.1, or the like. In any case, the initial version number is provided by subprocess 260 to subprocess 270.

In subprocess 270, a new snapshot is created with the new version number that was received from subprocess 240 or the initial version number that was received from subprocess 260. In an embodiment, every artifact of application programming interface 140, including each operation available through interface 142 and the implementation of those operation(s), utilize version control. The snapshot for a deployment of an application programming interface 140 may comprise, for each artifact in application programming interface 140, an identifier and version of the artifact, as well as a list of identifiers and versions of each of the artifact's dependencies. For example, a snapshot may comprise, for each operation available through interface 142, the operation identifier, the identifier and version of the implementation 144 invoked by this operation, the identifier and version of the input schema for this operation, and the identifier and version of the output schema for this operation. In other words, each of the artifact's dependencies is itself treated as a versioned artifact.

In subprocess 280, the metadata for the deployment of application programming interface in subprocess 210 is updated to comprise the version number of the deployment and/or a reference to the snapshot of the deployment created in subprocess 270. Thus, for each deployment of an application programming interface 140, the version number in the metadata for that deployment is updated, and a new snapshot, representing the new deployment, is created and linked to the metadata for that deployment.

In an embodiment, the metadata for an application programming interface 140 may comprise a list that includes a reference to the snapshot of each and every deployment of that application programming interface 140. Each snapshot may be associated with the version number for that snapshot. Thus, the snapshot and version number of a prior deployment of an application programming interface 140 may be easily retrieved in subprocess 230 from the list of snapshots in the metadata for that application programming interface 140.

In an embodiment, a new version number may be automatically associated with each deployment of application programming interface 140. In this case, the metadata for the deployment may be automatically (i.e., without any user intervention) updated with the new version number, which may be provided to the developer and/or consumer via the graphical user interface of server application 112.

In an alternative embodiment, the version number may be provided as a recommendation to the developer, via a graphical user interface of server application 112, for example, prior to subprocess 280 (e.g., after subprocess 240 or 260, or after subprocess 270). In this case, the developer may confirm the version number prior to publication, in which case, the metadata may be updated with the version number in subprocess 280 as described before, or the user may override the version number with a user-specified version number, in which case, the metadata may be updated with the user-specified version number in subprocess 280. In the former scenario, the version number is semi-automatically updated (e.g., with user confirmation), whereas in the latter scenario, the version number is manually updated (e.g., with user specification).

From the user's perspective, the user may perform an operation (e.g., by selecting an input in the graphical user interface of server application 112) to deploy or initiate deployment of an application programming interface 140 (e.g., in subprocess 210). Immediately after or contemporaneously with performing this operation, the user may be presented with a dialog box indicating the recommended version number output by subprocess 240 or 260. The dialog box may comprise one or more inputs for specifying and submitting a different version number, and/or confirming the recommended version number. The version number that is submitted or confirmed is the version number that is ultimately associated with the deployment of application programming interface 140.

3. Example Version Number Calculation

Figure 3:
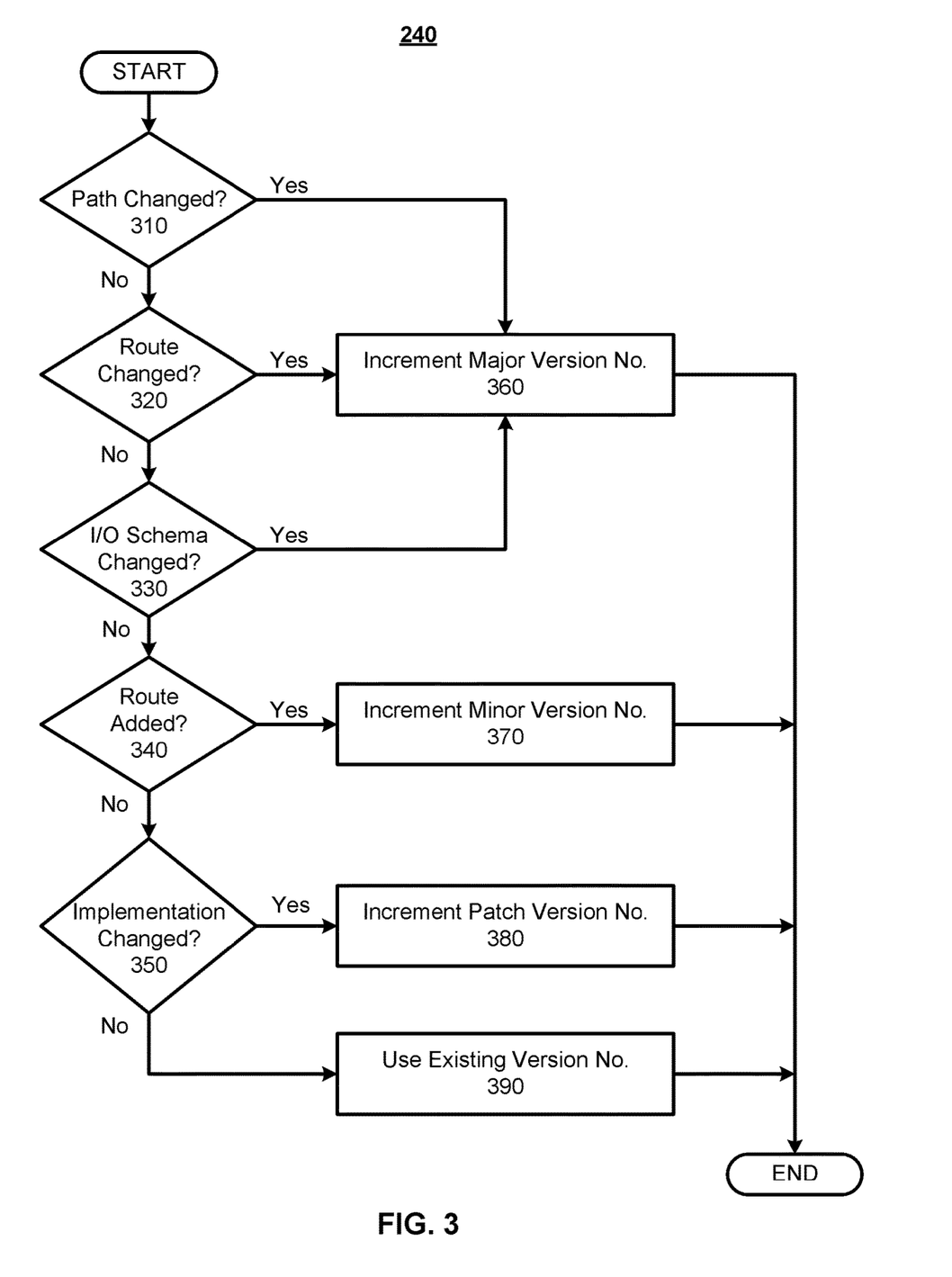
FIG. 3 illustrates a subprocess for calculating a new version number based on one or more changes, if any, to an application programming interface, according to an embodiment.

FIG. 3 illustrates an example of subprocess 240 in process 200 for calculating a new version number based on one or more changes, if any, to an application programming interface 140, according to an embodiment. At a high level, subprocess 240 treats an application programming interface 140 as a combination of the interface 142 and the implementations 144 of operations defined by interface 142. When application programming interface 140 is deployed, subprocess 260 will provide the application programming interface 140 with an initial version number (e.g., 1.0.0). Subsequently, for a change in the application programming interface 140 of a new deployment, relative to a prior deployment, subprocess 240 will calculate a new version number based on the nature of the change. This new version number, when considered relative to the prior version number, contains semantic information about the nature of the change.

In particular, a change to the major version number represents a change to interface 142 that may require a change to clients (e.g., third-party systems 170) that utilize application programming interface 140. For instance, such a change may cause an error in (i.e., "break") the client. Examples of such changes include changes to the base path of an operation in interface 142, removal of an operation from interface 142, changes to the definition of an operation in interface 142 (e.g., change to the input and/or output schema), and the like. When the major version number is incremented, the developer and consumers know that the new deployment may break existing client software. Thus, the developer can ensure that consumers know this, and consumers can ensure that their client software is compatible with the new deployment of application programming interface 140 and/or that they budget sufficient time to migrate their client software from the prior deployment to the new deployment.

A change to the minor version number represents a change to interface 142 that does not require a change to any clients that utilize application programming interface 140. Such a change will not cause an error in the client. Examples of such a change include, without limitation, adding a new operation to interface 142, adding an optional field to the input of an existing operation in interface 142, adding a field to the output of an existing operation in interface 142, changing an input field that was previously required to optional, or the like. When only the minor version number is incremented, the developer and consumers know that interface 142 may contain new features that may be beneficial for client software. Thus, the developer can ensure that consumers know this, and consumers can incorporate the new features into their client software if desired.

A change to the patch version number represents a change to implementation 144 that does not affect interface 142. In other words, the change only affects the behavior of application programming interface 140. An example of such a change is a new implementation 144 of an operation that uses the same input and output schemas as the prior implementation 144 of the operation. When only the patch version number is incremented, the consumer knows that no changes are required of their client software, but that testing the behavior and/or functionality of the client software may be appropriate.

For the purposes of illustration, a specific example will be used to describe process 240. In this example, it is assumed that an application programming interface 140, with version number 1.0.0, comprises an interface 142 that consists of two operations:

"GET /pets/allDogs", which receives inputA, calls an implementation 144 called retrieveAllDogs, and returns outputA; and
"GET /pets/allCats", which receives inputB, calls an implementation 144 called retrieveAllCats, and returns outputB.

Each of "GET/pets/allDogs" and "GET/pets/allCats" represents a route through interface 142. Within these routes, each of "/pets/allDogs" and "/pets/allCats" represents a path in interface 142.

Subprocesses 310-330 determine whether or not there has been a major change to application programming interface 140. In particular, subprocess 310 determines whether or not a path in interface 142 has changed. For example, a change of "GET/pets/allDogs" to "GET/animals/allDogs" would represent a change to a path in interface 142 in subprocess 310.

In addition, subprocess 320 determines whether or not a route has changed. For example, the change of "GET/pets/allDogs" to "POST/pets/allDogs" and the removal of "GET/pets/allDogs" from interface 142 both represent examples of a change to a route in subprocess 320.

Furthermore, subprocess 330 determines whether or not the input schema and/or output schema of an operation has changed so as to be incompatible with (i.e., break/cause an error in) existing client software. For example, the removal of inputA or the addition of a required inputC to the input of "GET/pets/allDogs" would represent a change to the input schema of this operation in subprocess 330, and the removal of outputA or the addition of a required outputC to the output of "GET/pets/allDogs" would represent a change to the output schema of this operation in subprocess 330. The change of an existing input from optional to required would also represent a change to the input schema in subprocess 330. It should be understood that changes to the input schema and/or output schema that do not break existing client software would not trigger subprocess 330.

When a path is changed (i.e., "Yes" in subprocess 310), a route is changed (i.e., "Yes" in subprocess 320), and/or an input and/or output schema of an operation is changed in an incompatible manner (i.e., "Yes" in subprocess 330), the major version number is incremented in subprocess 360. For example, the version number 1.0.0 would be incremented to 2.0.0. This incremented version number is output by subprocess 240 to subprocess 270 in process 200.

On the other hand, when no path is changed (i.e., "No" in subprocess 310), no route is changed (i.e., "No" in subprocess 320), and no input and output schema of any operation is changed in an incompatible manner (i.e., "No" in subprocess 330), subprocess 340 determines whether or not there has been a minor change to application programming interface 140. In particular, subprocess 340 determines whether or not a route has been added. For example, the addition of a new operation "GET pets/allHamsters," which calls a new implementation 144 called retrieveAllHamsters, or the addition of a new route "GET/animals/allCanines" that, as with "GET/pets/allDogs", calls retrieveAllDogs, would represent the addition of a route in subprocess 340.

When a route is added (i.e., "Yes" in subprocess 340), the minor version number is incremented in subprocess 370. For example, the version number 1.0.0 would be incremented to 1.1.0. This incremented version number is output by subprocess 240 to subprocess 270 in process 200.

On the other hand, when no route has been added (i.e., "No" in subprocess 340), subprocess 350 determines whether or not there has been a patch-level change to application programming interface 140. In particular, subprocess 350 determines whether or not implementation 144 has changed. For example, a new version of retrieveAllDogs or the replacement of retrieveAllDogs with retrieveAllCanines (i.e., called by "GET/pets/allDogs"), which accepts the same input(s) and returns the same output(s) as retrieveAllDogs, would represent a change to implementation 144.

When implementation 144 has changed (i.e., "Yes" in subprocess 350), the patch version number is incremented in subprocess 380. For example, the version number 1.0.0 would be incremented to 1.0.1. This incremented version number is output by subprocess 240 to subprocess 270 in process 200.

When implementation 144 has not changed (i.e., "No" in subprocess 350), there has been no change to application programming interface 140 that warrants a change in the version number. This may occur when an identical application programming interface 140 has been redeployed, or when the changes do not affect the usage or behavior of application programming interface 140. Accordingly, in subprocess 390, the existing version number is output by subprocess 240 to subprocess 270.

Notably, in the illustrated embodiment of subprocess 240, only a single component of the version number is incremented. In particular, if the major version number is incremented, the minor version number and the patch version number are not incremented. In addition, if the minor version number is incremented, the patch version number is not incremented. However, in an alternative embodiment, two or more components of the version number may be incremented in the same iteration of subprocess 240. For example, if a path is changed, a route is added, and an implementation is changed, all of the major, minor, and patch version numbers may be incremented. In this case, the version number 1.0.0 would change to 2.1.1.

In an embodiment, when a higher-order component of the version number is incremented, all lower-order components of the version number may be initialized (e.g., to zero). In particular, when the major version number is incremented, the minor version number and patch version number may be initialized to zero. For example, when incrementing the major version number in subprocess 360, the version number 1.5.3 would change to version number 2.0.0. Similarly, when incrementing the minor version number, the patch version number may be initialized to zero. For example, when incrementing the minor version number in subprocess 370, the version number 1.5.3 would change to version number 1.6.0. It should be understood, when incrementing the patch version number, only the patch version number would be incremented. For example, when incrementing the patch version number in subprocess 380, the version number 1.5.3 would change to 1.5.4.

4. Example Processing System

Figure 4:
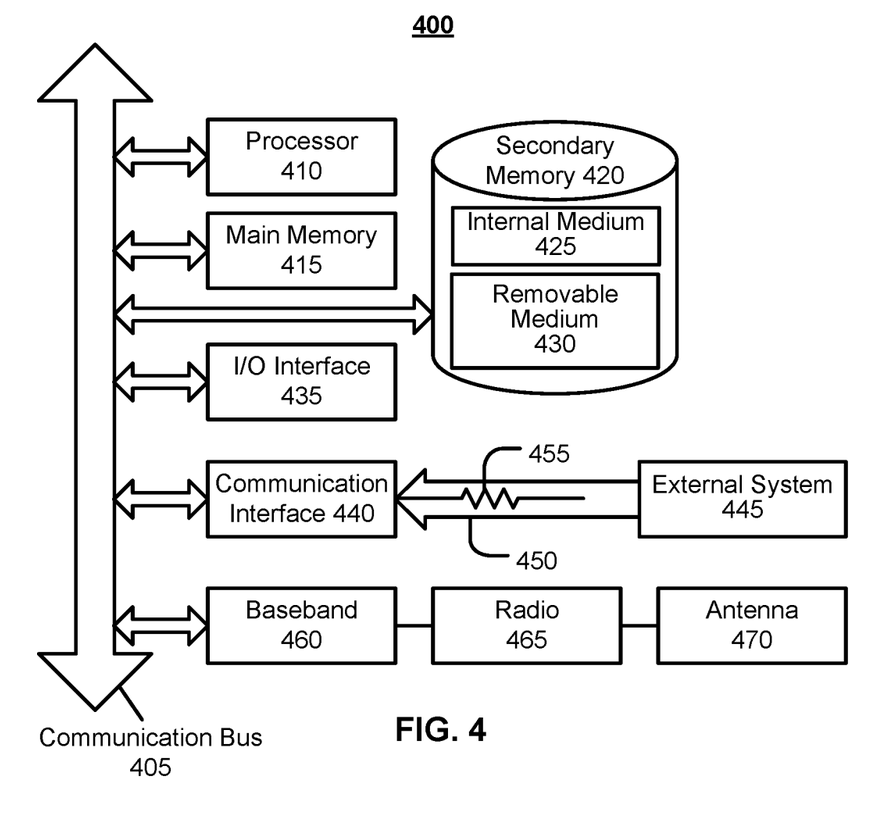
FIG. 4 illustrates an example processing system, by which one or more of the processes described herein may be executed, according to an embodiment.

FIG. 4 illustrates an example processing system, by which one or more of the processes described herein may be executed, according to an embodiment. For example, system 400 may be used to store and/or execute software implementing process 200, including subprocess 240, and/or may represent components of platform 110, user system(s) 160, third-party system(s) 170, and/or other processing devices described herein. System 400 can be any processor-enabled device (e.g., server, personal computer, etc.) that is capable of wired or wireless data communication. Other processing systems and/or architectures may also be used, as will be clear to those skilled in the art.

System 400 may comprise one or more processors 410. Processor(s) 410 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 410. Examples of processors which may be used with system 400 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 410 may be connected to a communication bus 405. Communication bus 405 may include a data channel for facilitating information transfer between storage and other peripheral components of system 400. Furthermore, communication bus 405 may provide a set of signals used for communication with processor 410, including a data bus, address bus, and/or control bus (not shown). Communication bus 405 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 400 may comprise main memory 415. Main memory 415 provides storage of instructions and data for programs executing on processor 410, such as any of the software discussed herein. It should be understood that programs stored in the memory and executed by processor 410 may be written and/or compiled according to any suitable language, including without limitation C/C++, Java, JavaScript, Perl, Python, Visual Basic, .NET, and the like. Main memory 415 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 400 may comprise secondary memory 420. Secondary memory 420 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 400. The computer software stored on secondary memory 420 is read into main memory 415 for execution by processor 410. Secondary memory 420 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 420 may include an internal medium 425 and/or a removable medium 430. Internal medium 425 and removable medium 430 are read from and/or written to in any well-known manner. Internal medium 425 may comprise one or more hard disk drives, solid state drives, and/or the like. Removable storage medium 430 may be, for example, a magnetic tape drive, a compact disc (CD) drive, a digital versatile disc (DVD) drive, other optical drive, a flash memory drive, and/or the like.

System 400 may comprise an input/output (I/O) interface 435. I/O interface 435 provides an interface between one or more components of system 400 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet computer, or other mobile device).

System 400 may comprise a communication interface 440. Communication interface 440 allows software to be transferred between system 400 and external devices, networks, or other information sources. For example, computer-executable code and/or data may be transferred to system 400 from a network server via communication interface 440. Examples of communication interface 440 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 400 with a network (e.g., network(s) 150) or another computing device. Communication interface 440 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 440 is generally in the form of electrical communication signals 455. These signals 455 may be provided to communication interface 440 via a communication channel 450 between communication interface 440 and an external system 445. In an embodiment, communication channel 450 may be a wired or wireless network (e.g., network(s) 150), or any variety of other communication links. Communication channel 450 carries signals 455 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 415 and/or secondary memory 420. Computer-executable code can also be received from an external system 445 via communication interface 440 and stored in main memory 415 and/or secondary memory 420. Such computer-executable code, when executed, enables system 400 to perform the various functions of the disclosed embodiments as described elsewhere herein.

In an embodiment that is implemented using software, the software may be stored on a computer-readable medium and initially loaded into system 400 by way of removable medium 430, I/O interface 435, or communication interface 440. In such an embodiment, the software is loaded into system 400 in the form of electrical communication signals 455. The software, when executed by processor 410, preferably causes processor 410 to perform one or more of the processes and functions described elsewhere herein.

System 400 may comprise wireless communication components that facilitate wireless communication over a voice network and/or a data network (e.g., in the case of user system 160). The wireless communication components comprise an antenna system 470, a radio system 465, and a baseband system 460. In system 400, radio frequency (RF) signals are transmitted and received over the air by antenna system 470 under the management of radio system 465.

In an embodiment, antenna system 470 may comprise one or more antennae and one or more multiplexors (not shown) that perform a switching function to provide antenna system 470 with transmit and receive signal paths. In the receive path, received RF signals can be coupled from a multiplexor to a low noise amplifier (not shown) that amplifies the received RF signal and sends the amplified signal to radio system 465.

In an alternative embodiment, radio system 465 may comprise one or more radios that are configured to communicate over various frequencies. In an embodiment, radio system 465 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 465 to baseband system 460.

If the received signal contains audio information, then baseband system 460 decodes the signal and converts it to an analog signal. Then the signal is amplified and sent to a speaker. Baseband system 460 also receives analog audio signals from a microphone. These analog audio signals are converted to digital signals and encoded by baseband system 460. Baseband system 460 also encodes the digital signals for transmission and generates a baseband transmit audio signal that is routed to the modulator portion of radio system 465. The modulator mixes the baseband transmit audio signal with an RF carrier signal, generating an RF transmit signal that is routed to antenna system 470 and may pass through a power amplifier (not shown). The power amplifier amplifies the RF transmit signal and routes it to antenna system 470, where the signal is switched to the antenna port for transmission.

Baseband system 460 is communicatively coupled with processor(s) 410, which have access to memory 415 and 420. Thus, software can be received from baseband processor 460 and stored in main memory 410 or in secondary memory 420, or executed upon receipt. Such software, when executed, can enable system 400 to perform the various functions of the disclosed embodiments.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to, in response to initiation of a new deployment of an application programming interface:
   determine whether or not a prior deployment of the application programming interface exists, wherein the application programming interface comprises an interface and an implementation;
   when a prior deployment exists, calculate a version number based on at least one change to the application programming interface between the prior deployment and the new deployment, wherein the version number comprises a major version number and a minor version number, and wherein calculating the version number comprises
      determining whether or not the at least one change affects operation of clients that utilize the application programming interface,
      when determining that the at least one change affects operation of the clients, incrementing the major version number, to thereby indicate that the at least one change may cause an error in existing client software, and
      when determining that the at least one change does not affect operation of the clients, not incrementing the major version number, to thereby indicate that the at least one change will not cause an error in the existing client software;
   when no prior deployment exists, determine the version number based on an initial version number;
   add the version number to metadata associated with the new deployment, wherein the version number semantically conveys whether or not the new deployment is compatible with the existing client software or whether the existing client software will need to be migrated to the new deployment; and
   deploy the application programming interface from a test environment to a production environment.

2. The method of claim 1, wherein determining whether or not the at least one change affects operation of the clients comprises determining that the at least one change affects operation of the clients when the at least one change comprises one or more of:
   changing a path within the interface;
   removing a route through the interface;
   changing an input schema of an operation in the interface; or
   changing an output schema of an operation in the interface.

3. The method of claim 1, wherein calculating the version number further comprises, when determining that the at least one change does not affect operation of the clients:
   determining whether or not the at least one change adds a route through the interface;
   when determining that the at least one change adds a route through the interface, incrementing the minor version number; and
   when determining that the at least one change does not add a route through the interface, not incrementing the minor version number.

4. The method of claim 3, wherein the version number further comprise a patch version number.

5. The method of claim 4, wherein calculating the version number further comprises, when determining that the at least one change does not add a route through the interface:
   determining whether or not the at least one change is to the implementation;
   when determining that the at least one change is to the implementation, incrementing the patch version number; and
   when determining that the at least one change is not to the implementation, using a version number of the prior deployment as the version number.

6. The method of claim 5, wherein determining whether or not the at least one change is to the implementation comprises comparing one or more internal version numbers in the implementation of the new deployment to one or more internal version numbers in the implementation of the prior deployment.

7. The method of claim 1, further comprising using the at least one hardware processor to, when no prior deployment exists, create metadata for the new deployment.

8. The method of claim 1, further comprising using the at least one hardware processor to create a snapshot of the new deployment with the version number.

9. The method of claim 8, wherein the snapshot comprises an identifier and version of each artifact of the application programming interface, including each operation in the application programming interface.

10. The method of claim 9, wherein the snapshot further comprises an identifier and version of each dependency of each artifact of the application programming interface.

11. The method of claim 9, wherein the snapshot further comprises an identifier and version of an implementation of each operation in the application programming interface.

12. The method of claim 9, wherein the snapshot further comprise an identifier and version of each of an input schema and an output schema of each operation in the application programming interface.

13. The method of claim 1, wherein the version number is automatically added to the metadata.

14. The method of claim 1, wherein the version number is added to the metadata in response to a user operation.

15. The method of claim 1, wherein the version number comprises a major version number, followed by a minor version number, followed by a patch version number.

16. The method of claim 1, further comprising, based on the version number that was added to the metadata associated with the new deployment, for at least one existing client software, performing one or both of testing the at least one existing client software for compatibility with the new deployment, or migrating the at least one existing client software to the new deployment.

17. A system comprising:
at least one hardware processor; and
one or more software modules that are configured to, when executed by the at least one hardware processor, in response to initiation of a new deployment of an application programming interface,
determine whether or not a prior deployment of the application programming interface exists, wherein the application programming interface comprises an interface and an implementation,
when a prior deployment exists, calculate a version number based on at least one change to the application programming interface between the prior deployment and the new deployment, wherein the version number comprises a major version number, a minor version number, and a patch version number, and wherein calculating the version number comprises
determining whether or not the at least one change affects operation of clients that utilize the application programming interface,
when determining that the at least one change affects operation of the clients, incrementing the major version number, to thereby indicate that the at least one change may cause an error in existing client software, and
when determining that the at least one change does not affect operation of the clients, not incrementing the major version number, to thereby indicate that the at least one change will not cause an error in the existing client software,
when no prior deployment exists, determine the version number based on an initial version number,
add the version number to metadata associated with the new deployment, wherein the version number semantically conveys whether or not the new deployment is compatible with the existing client software or whether the existing client software will need to be migrated to the new deployment, and
deploy the application programming interface from a test environment to a production environment.

18. A non-transitory computer-readable medium having instructions stored therein, wherein the instructions, when executed by a processor, cause the processor to, in response to initiation of a new deployment of an application programming interface:
determine whether or not a prior deployment of the application programming interface exists, wherein the application programming interface comprises an interface and an implementation;
when a prior deployment exists, calculate a version number based on at least one change to the application programming interface between the prior deployment and the new deployment, wherein the version number comprises a major version number, a minor version number, and a patch version number, and wherein calculating the version number comprises
determining whether or not the at least one change affects operation of clients that utilize the application programming interface,
when determining that the at least one change affects operation of the clients, incrementing the major version number, to thereby indicate that the at least one change may cause an error in existing client software, and
when determining that the at least one change does not affect operation of the clients, not incrementing the major version number, to thereby indicate that the at least one change will not cause an error in the existing client software;
when no prior deployment exists, determine the version number based on an initial version number;
add the version number to metadata associated with the new deployment, wherein the version number semantically conveys whether or not the new deployment is compatible with the existing client software or whether the existing client software will need to be migrated to the new deployment; and
deploy the application programming interface from a test environment to a production environment.

* * * * *